Nov. 9, 1954    F. T. PALMQVIST    2,694,082
METHOD OF CONTINUOUSLY REFINING FATTY
OILS WITH AN INORGANIC ACID
Filed April 4, 1951    2 Sheets-Sheet 1
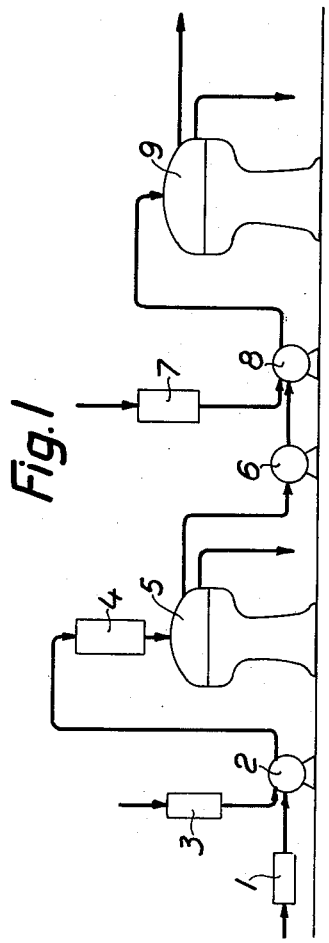
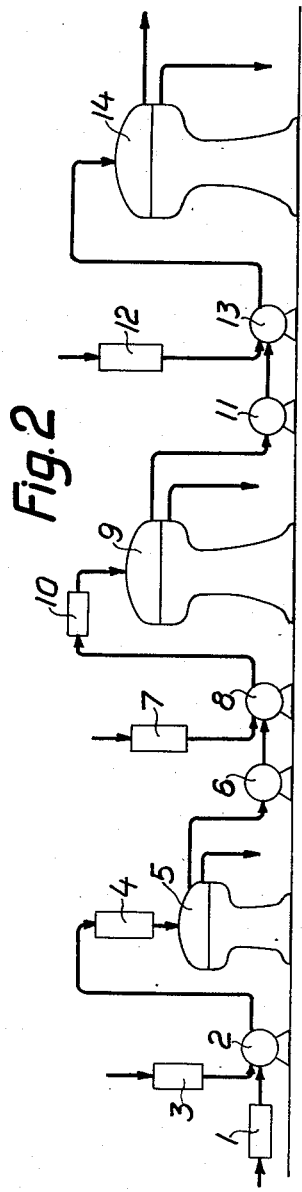
INVENTOR.
Fredrik Teodor Palmqvist
BY Nov. 9, 1954  F. T. PALMQVIST  2,694,082
METHOD OF CONTINUOUSLY REFINING FATTY
OIL WITH AN INORGANIC ACID
Filed April 4, 1951  2 Sheets-Sheet 2
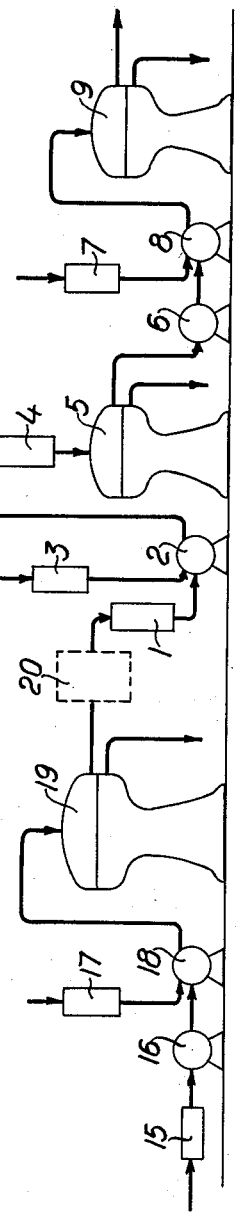
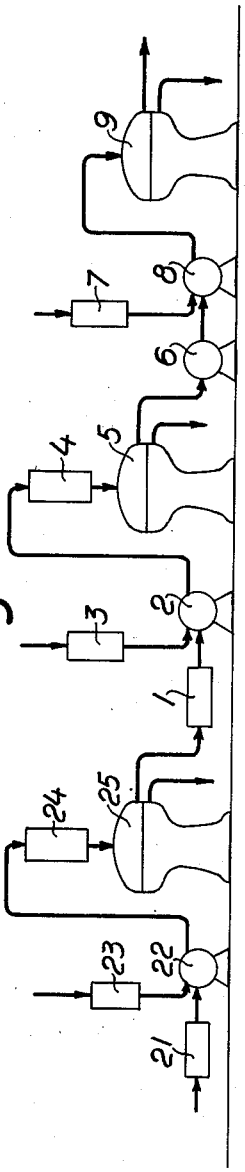
INVENTOR.
Fredrik Teodor Palmqvist
BY

United States Patent Office 2,694,082
Patented Nov. 9, 1954

2,694,082

METHOD OF CONTINUOUSLY REFINING FATTY OILS WITH AN INORGANIC ACID

Fredrik Teodor Palmqvist, Stockholm, Sweden, assignor to Aktiebolaget Separator, Stockholm, Sweden, a corporation of Sweden Application April 4, 1951, Serial No. 219,164

4 Claims. (Cl. 260—424)

This invention effects improvements in the art of refining fatty oils to eliminate coloring, flavoring and mucilaginous substances (here referred to collectively as decoloring) by means of inorganic acids such as sulfuric acid, hydrochloric acid or chlorosulfonic acid.

The object is to provide a continuous process which substantially avoids side reactions between the acid and oil (such as sulfonation of the oil) and which yields a product that is not only substantially free of the substance mentioned but is also substantially free of undesirable effects of the acid treatment itself.

The side-reactions between the acid and the oil, such as sulfonation when sulfuric acid is used, are time-accentuated exothermic reactions in which the activity of the acid increases with temperature. Such reactions are therefore favored if the admixture of the acid and the oil creates conditions in which there is a local increase of temperature prevailing for any considerable time in any part of the body of oil to a degree such that any substantial part of the neutral fat in the oil is thus acted upon by the acid, with the production of discoloring substances that can not be removed. Such conditions exist in known processes in which the acid is vigorously mixed with a large batch of oil and the resulting sludge after agglomeration is separated by sedimentation.

Such deleterious side-reactions are substantially avoided if the acid is mixed with a continuous stream of oil and is quickly and finely dispersed in the stream of oil. A relatively small quantity of oil is involved in the mixing at any instant and a quick and fine dispersal is possible, giving a great contact surface between the small drops of acid and the oil. Local or prolonged rises in temperature to a degree favorable to the undesired side-reactions are thus avoided.

The decoloring action of the acid is believed to be an extraction in which the acid extracts coloring matter, small quantities of acid being simultaneously dissolved in the oil. The acid in the extract then reacts with the coloring matter yielding a sludge which must be substantially removed. This decoloring action takes place rapidly, and the continuous process here described therefore provides a short time for it, followed by a longer time in which conditions are established which favor an agglomeration of the initially dispersed sludge particles to promote effective separation of the sludge by centrifugal action. Agitation impairs agglomeration so it is desirable to confine the agitation necessary to fine dispersion of the acid to a brief period, effecting quick dispersal, and then pass the oil-acid mixture to a quieter zone for the agglomeration. The time required for sufficient agglomeration is as a rule very short, less than 2 minutes, although if a weak acid is used, longer periods up to 6 minutes may be required. The agglomeration need not be and preferably is not complete.

Following the agglomeration step, the sludge is substantially removed by a centrifuge, which is a quickly acting separator. The capacity of the centrifuge is increased by agglomeration of the sludge into larger particles than those initially formed, and is increased also by lowering the viscosity of the oil, as by increase of its temperature. These desiderata from the stand-point of centrifugal separation are therefore factors affecting the preceding steps and introduce an element of compromise, since if the decoloring step alone were considered it would be accomplished at as low a temperature as possible, which would mean having a higher viscosity than would be ideal for the centrifugal separation. It is better to work with a lower temperature than that which would give the ideal viscosity for separation, and to allow the oil after separation to retain a quantity of sludge which can be removed by other methods described in what follows, along with acid dissolved in the oil.

The acid can be finely dispersed in the oil in several ways. It is preferable to split up the acid by mechanical means and without intimate mixture with air. It has been stated that air bubbles adhering to sludge drops may become enclosed, during agglomeration, in the acid sludge, thereby reducing the specific gravity of the sludge and so impairing the centrifugal separation. Having regard to the needs of the separating step, the oil is desirably preheated to lower its viscosity. In the case of rape oil, it is found that the viscosity should be between 5° and 17° Engler, corresponding to a temperature of 45° to 15° C. Other oils require a different temperature range for the same viscosity range, which is believed to be generally desirable. With these guides, the user of the process is free however to make his own compromise between the viscosity suitable for separation and the temperature suitable for avoiding substantial side-reactions in the steps preceding separation. The quick dispersal of the acid in the continuous stream of oil, and the relatively short time needed for the decoloring action of the finely dispersed acid, make such compromise feasible, especially in view of the treatment here provided following the separation.

A certain quantity of acid of suitable concentration is required in order to extract coloring matter to the desired extent. Concentrated acid extracts coloring matter more completely than diluted acid, and therefore concentrated acid should be used. This is not always possible, however, since the power of the acid sludge to agglomerate decreases with increased free fatty acid content in the oil and with increased acid concentration. Oils with a low content of free fatty acids—a few per cent—can be treated with concentrated acid. With 1% of free fatty acids in the oil, even fuming sulfuric acid has rendered satisfactory agglomeration. In the case of a high free fatty acid content, diluted acid must be used; it should, however, not be weaker than 60%. Should the fatty acid content be so high that agglomeration will not occur at that concentration, the free fatty acids should be wholly or partly neutralized and eliminated before the oil is decolored.

Oils with a high percentage of free fatty acids may often be decolored by admixing concentrated acid first and then water. If concentrated acid is finely dispersed in oil containing a suitable quantity of water in the form of small drops, part of the acid will be diluted at once by the water. The larger part of the acid drops, in the form of concentrated acid, will extract coloring matter before their meeting the water drops. Agglomeration takes place when the concentration of the acid has been sufficiently reduced. With this mode of working more water can be introduced than the corresponding water quantity in the acid when diluted acid is mixed with the oil. In this case the acid concentration must be chosen by a compromise between the desiderata, good decoloring and good agglomeration.

For certain oils it is preferable to admix, first, concentrated acid into the oil and then, after a suitable time of reaction, to admix the water.

A good result is obtained if concentrated acid is admixed to the oil and then, while stirring gently, decolored oil containing the required water quantity is introduced into the oil. With this mode of operation and with the first-mentioned one, the water can be mixed in a very finely divided form with the oil by condensing steam in the oil.

The advantage of concentrated acid is best utilized when refining oils with a high content of free fatty acids if these are removed wholly or partly before admixing the acid. The removal can be done by neutralizing the free fatty acids with alkali; the soap formed is then to be eliminated before decoloring the oil with acid.

An important improvement is brought about by a further treatment after centrifugal separation of the sludge from the oil, making it possible in the preceding steps to effect more desirable compromises of the several factors already noted by permitting the retention of some sludge in the oil after separation. In other words, in view of the treatment after separation it is not necessary to obtain complete agglomeration or complete separation of the acid sludge, and in consequence, it is not necessary to employ a temperature which would favor side-reactions of the acid on the oil. Mutually compatible conditions for the several steps of the refining process are therefore more easily obtained.

This further treatment after separation consists of a neutralization of the sludge remaining in the oil, suitably in connection with neutralization of the free fatty acids in the oil. Such neutralization is especially desirable in the case of drying oils which are used, for example, in painting. Following the introduction and admixture of the neutralizing agent, it is preferable to pass the stream of oil in process through a further step of centrifugal separation to remove the neutralization products.

It is preferable to effect this neutralization of the remaining sludge and dissolved inorganic acid with a salt of a weak acid, such as an acid alkali salt. The preferable salts are neutral or acid alkali. Ammonium carbonate is suitable. Such a salt, even if present in excess, has a very slow time of reaction with the free fatty acids of the oil and therefore the formation of soap is avoided while neutralizing the inorganic acid left in the sludge or dissolved in the oil. If the oil is to be used in making soap, complete neutralization is not necessary, and only the quantity of alkali is added that is required to neutralize the acid sludge and the dissolved inorganic acid.

Before describing the plants shown in the drawings, attention is given to certain matters relative to the treatment of particular oils.

Oil such as soya oil render at the refining a valuable by-product which is separated off by hydration. Oils of this kind should be de-slimed by known methods before being refined with an inorganic acid.

Oils which are obtained by extraction with volatile hydrocarbons contain as a rule more coloring matter than pressed oils. When the volatile solvent is distilled off, mucilaginous substances are precipitated which partly settle on the heating surfaces of the distilling apparatus. Besides, some coloring matter may be decomposed, yielding decomposition products difficult to eliminate. It may for these reasons be suitable to refine the miscella—the solution of oil in light hydrocarbons—with sulfuric acid in the way described above. As the miscella has a very low viscosity, the refining may be carried out at low temperature. It may even be possible to use temperatures below 0° C., which may require longer reaction—and contact times than the aforementioned ones. Some oils are liberated from stearic acid glycerides with high melting point by filtration at a comparatively low temperature. This temperature is as a rule lower than the reaction temperature when decoloring with sulfuric acid or some other inorganic acid. It is, of course, possible to separate off the acid sludge together with other precipitated high-melting fat components at the temperature used when de-stearinizing, if the capacity of the separator is reduced.

Fig. 1 shows a plant for decoloring with inorganic acid and neutralizing of acid components in the oil. In this figure, 1 is an oil heater, 2 is a mixer which without aeration admixes acid from a dosage apparatus 3. From the mixer 2 the oil is passed in a continuous current through one or several columns 4 in order to bring about the contact time necessary for agglomeration. In a centrifuge 5, acid sludge is separated from the oil. From the separator 5, the oil is conveyed by a pump 6 to a neutralizing stage. Here, the oil is mixed with alkali, which is dosed by means of the dosage device 7, in a mixer 8, and is then passed to a centrifuge 9, in which neutralizing products are separated from the oil. The oil may then be subjected to the treatments which are normal when refining fatty oils, such as washing with water and filtration of soapstock for eliminating the soap dissolved in the oil, and deodorization.

Fig. 2 shows a plant for decoloring with an inorganic acid, neutralizing of mineral acid components with a salt of a weak acid and then possibly neutralizing of fatty acids with alkali. The decoloring with acid is done in the same way as indicated for Fig. 1. The neutralization of mineral acid with a salt is also carried out in apparatus similar to that used for neutralizing in the procedure described for Fig. 1. (The centrifuge 9 can, however, be replaced to advantage here by a continuously working decanting apparatus.) A heater 10 is interposed between the mixer 8 and the centrifuge 9. From the centrifuge 9 the oil is pumped by a pump 11 to a mixer 13, in which fatty acids are neutralized with alkali, dosed from a dosage device 12. In the centrifuge 14 the soap formed is then separated off, whereupon the oil is subjected to a final treatment of the same kind as indicated for the oil produced according to Fig. 1.

In Fig. 3 a mode of operation is shown which may be used when oil with a high free fatty acid content is to be decolored with inorganic acid. 15 is a heater giving the oil the desired temperature. A pump 16 pumps the oil into a mixer 18 in which a neutralizing agent dosed by a dosage device 17 is admixed to the oil. The soap formed is eliminated from the oil in the separator 19. 20 is a device required under certain circumstances for washing out the soap dissolved in the oil. Then the oil passes through apparatus identical to that shown in Fig. 1, and so the same reference characters have been maintained. It is, of course, also possible to proceed in this stage according to the mode of operation as described for Fig. 2.

Fig. 4 shows a plant for treating oils with so high a percentage of mucilaginous substances (lecithin, etc.) that it is economical to recover these in a separate stage. The oil temperature is determined by a heater 21. In a mixing device 22 the oil is mixed with water dosed from a dosage device 23. In a container 24 the necessary contact time is ensured to allow the mucilaginous substances to be hydrated and to separate in flocks. In the centrifuge 25 these mucilaginous substances are removed whereupon the oil is subjected to the treatment indicated for Fig. 1 or Fig. 2. The reference characters used for these figures have thus been maintained for Fig. 4, for which latter a further description is thus superfluous.

The advantage of this complete process over the known practice of de-sliming with water followed by neutralization with lye and washing with water, is shown by the following comparative data giving results with rape oil. The untreated rape oil had a sharp, nasty flavor and a sharp, rancid odor, and its color was as shown by the index numbers (Levibond) in the table below (cf. item 1). When treated by the reference process (de-sliming, etc.) the oil still had a sharp flavor of radish and a faint odor of turnip. Its color was the same as to yellow, was improved somewhat as to red, and was impaired as to blue (cf., item 2 in the table below). When the same starting material, rape oil, was treated with 3% of concentrated sulfuric acid (98% conc.), employing a temperature of 30° C. and a contact time of 2 minutes, followed by separation and neutralization with lye and a final washing with water, the resulting oil had a faint flavor of radish, a pure odor and a greatly improved color as to red and blue (cf., item 3 in the table below).

|  | Comparative Color Data (Levibond) | | |
| --- | --- | --- | --- |
|  | Yellow | Red | Blue |
| 1. Untreated rape oil | 30 | 30 | 4 |
| 2. Reference product | 30 | 13 | 16 |
| 3. Improved product | 30 | 3 | 0 |

The reference product (de-sliming, etc. process) can be somewhat improved in color by a further treatment with an adsorbent consisting of 3% of a mixture of activated bleaching earth and active carbon, having 70% of the former and 30% of the latter. After such adsorption, the index number for red was 7.7 and for blue was 14. This is still substantially inferior to the product of the process here described.

In addition to this direct improvement in color, flavor and odor, any subsequent deodorization is greatly simplified.

As examples of salts of weak acids which have been found suitable may be mentioned alkali metal and ammonium salts such as potassium, sodium and ammonium salts of carbonic acid, boric acid, silic acid and phosphoric acid.

As examples of acid alkali salts which have been found suitable may be mentioned sodiumbicarbonate, potassiumbicarbonate, ammoniumbicarbonate and primary and secondary sodiumortophosphate.

Instead of using an acid alkali salt in the neutralizing step, a metal oxide or hydroxide may be used belonging to one of the groups II, III or VIII of the periodical system.

As examples of preferred metal oxides belonging to group II of the periodical system may be mentioned magnesium and zinc oxide, to group III aluminum oxide and to group VIII iron oxide.

I claim:

1. A continuous process for refining fatty oils, in which a stream of oil is passed successively through a decoloring step of short duration wherein an inorganic acid is finely dispersed through the oil while maintaining the oil below a temperature favorable to substantial side-reactions between the oil and the acid, a step of longer duration in which the mixture from the first step is passed through a quiescent zone where the dispersed particles of acid sludge formed in the first step are agglomerated but only incompletely so a step of centrifugal separation to incompletely remove such sludge and acid, a step of adding a salt or weak acid to effect neutralization of the remaining acid sludge and dissolved inorganic acid, and a step of centrifugal separation after the neutralizing step to remove the neutralization products from the oil.

2. A process as in claim 1, in which the inorganic acid is an acid from the group consisting of sulfuric acid, hydrochloric acid and chlorosulfonic acid.

3. A process as in claim 1, in which there is used in the neutralizing step an acid alkali salt.

4. A process as in claim 1, in which there is used in the neutralizing step a metallic oxide or hydroxide belonging to one of the groups II, III or VIII of the periodical system.

References Cited in the file of this patent

UNITED STATES PATENTS

| Number | Name | Date |
|---|---|---|
| 1,744,843 | Taylor et al. | Jan. 28, 1930 |
| 1,964,875 | Freiburg | July 3, 1934 |
| 2,351,184 | Boone | June 13, 1944 |
| 2,550,288 | North | Apr. 24, 1951 |